(12) United States Patent
Huang et al.

(10) Patent No.: US 11,206,635 B2
(45) Date of Patent: Dec. 21, 2021

(54) PAGING INDICATION TRANSMISSION METHOD AND APPARATUS

(71) Applicant: HUAWEI TECHNOLOGIES CO., LTD., Guangdong (CN)

(72) Inventors: Huang Huang, Shenzhen (CN); Kuandong Gao, Chengdu (CN); Sainan Li, Chengdu (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 31 days.

(21) Appl. No.: 16/664,539

(22) Filed: Oct. 25, 2019

(65) Prior Publication Data

US 2020/0059891 A1    Feb. 20, 2020

Related U.S. Application Data

(63) Continuation of application No. PCT/CN2018/084124, filed on Apr. 23, 2018.

(30) Foreign Application Priority Data

Apr. 28, 2017  (CN) .......................... 201710294004.9

(51) Int. Cl.
*H04W 68/00*   (2009.01)
*H04W 76/27*   (2018.01)
(Continued)

(52) U.S. Cl.
CPC ......... *H04W 68/005* (2013.01); *H04L 1/0026* (2013.01); *H04L 5/0051* (2013.01);
(Continued)

(58) Field of Classification Search
CPC . H04W 68/005; H04W 76/27; H04W 72/005; H04W 72/042; H04W 72/1278;
(Continued)

(56) References Cited

U.S. PATENT DOCUMENTS

2005/0030918 A1    2/2005   Motegi et al.
2005/0277429 A1   12/2005   Laroia et al.
(Continued)

FOREIGN PATENT DOCUMENTS

CN          1578195 A      2/2005
CN        101060713 A     10/2007
(Continued)

OTHER PUBLICATIONS

Qualcomm Incorporated:"Paging design consideration", 3GPP Draft; R1-1705570, vol. RAN WG1, No. Spokane, USA; Apr. 3, 2017—Apr. 7, 2017, Apr. 2, 2017, XP051243698, 8 pages.
(Continued)

*Primary Examiner* — Ian N Moore
*Assistant Examiner* — Latresa A McCallum
(74) *Attorney, Agent, or Firm* — Womble Bond Dickinson (US) LLP

(57) ABSTRACT

This application discloses a paging indication transmission method, including: sending, by a network device, a first paging indication to a terminal device; and sending, by the network device, a second paging indication to the terminal device, where the first paging indication and the second paging indication form a complete paging indication of the terminal device. According to the foregoing paging indication transmission method and apparatus, the network device delivers the paging indication at two times, to reduce a payload for a single transmission of the paging indication.

19 Claims, 3 Drawing Sheets

(51) Int. Cl.
  *H04L 1/00* (2006.01)
  *H04L 5/00* (2006.01)
  *H04W 72/00* (2009.01)
  *H04W 72/04* (2009.01)
  *H04W 72/12* (2009.01)
  *H04W 80/02* (2009.01)

(52) U.S. Cl.
  CPC ....... *H04W 72/005* (2013.01); *H04W 72/042* (2013.01); *H04W 72/1278* (2013.01); *H04W 76/27* (2018.02); *H04W 80/02* (2013.01)

(58) Field of Classification Search
  CPC ..... H04W 80/02; H04W 76/10; H04W 28/16; H04W 72/00; H04W 8/20; H04W 74/002; H04L 1/0026; H04L 5/0051; H04B 17/24
  See application file for complete search history.

(56) References Cited

U.S. PATENT DOCUMENTS

| | | | |
|---|---|---|---|
| 2013/0301434 A1* | 11/2013 | Krishnamurthy | H04B 7/0617 370/252 |
| 2014/0036747 A1* | 2/2014 | Nory | H04W 74/0833 370/311 |
| 2014/0038647 A1 | 2/2014 | Zhang et al. | |
| 2014/0211750 A1* | 7/2014 | Larsson | H04L 5/0092 370/330 |
| 2016/0338006 A1 | 11/2016 | Lee et al. | |
| 2017/0353254 A1* | 12/2017 | Islam | H04L 25/022 |
| 2020/0077362 A1 | 3/2020 | Liu | |

FOREIGN PATENT DOCUMENTS

| | | |
|---|---|---|
| CN | 101217778 A | 7/2008 |
| CN | 101309435 A | 11/2008 |
| CN | 103124399 A | 5/2013 |
| CN | 103444248 A | 12/2013 |
| CN | 107223357 A | 9/2017 |

OTHER PUBLICATIONS

Catt: "NR PBCH and NR physical channel carried system information", 3GPP Draft; R1-1704538, vol. RAN WG1, No. Spokane, USA; Apr. 3, 2017—Apr. 7, 2017, Apr. 2, 2017, XP051242679, 4 pages.

* cited by examiner

PAGING INDICATION TRANSMISSION METHOD AND APPARATUS

CROSS-REFERENCE TO RELATED APPLICATIONS

This application is a continuation of International Application No. PCT/CN2018/084124, filed on Apr. 23, 2018, which claims priority to Chinese Patent Application No. 201710294004.9, filed on Apr. 28, 2017. The disclosures of the aforementioned applications are hereby incorporated by reference in their entireties.

TECHNICAL FIELD

This application relates to the field of communications technologies, and in particular, to a paging indication transmission method and an apparatus.

BACKGROUND

Compared with a carrier frequency in long term evolution (LTE), a higher carrier frequency above 6 GHz, such as 38 GHz or 72 GHz, is used in a 5G communications system, to implement wireless communication with larger bandwidth and a higher transmission rate. Because of a relatively high carrier frequency, a radio signal transmitted at the carrier frequency undergoes more severe fading in a space propagation process, and even it is difficult for a receive end to detect the radio signal. Therefore, in the 5G communications system, as shown in FIG. 1, a beamforming technology is used to obtain a beam with good directionality. A beam formation technology is used to limit signal transmission energy in a beam direction, thereby improving efficiency of sending and receiving a signal.

However, because a coverage area of a beam is relatively narrow, for some broadcast information transmission, beam scanning is needed during use of the beam formation technology. Terminal device grouping is proposed in 5G new radio (NR), to reduce beam scanning overheads caused in a transmission process of paging information. Group information of a terminal device may be carried in a paging indication. A network device sends the paging indication through a physical broadcast channel (PBCH) or a physical downlink control channel (PDCCH), and after receiving the paging indication, the terminal device reports beam information; and after receiving the beam information reported by the terminal device, the network device delivers a paging message. For example, 10 bits may be used in the paging indication to group terminal devices into 1024 groups. The terminal device may determine, based on information such as a device ID of the terminal device, a group to which the terminal device belongs.

Currently, the PBCH or the PDCCH is usually used to transmit all paging indications at one time, but a payload size of the PBCH or the PDCCH is limited. Consequently, if all bits in all the paging indications are added to the PBCH or the PDCCH and transmitted at one time, the payload size of the PBCH or the PDCCH is increased.

SUMMARY

This application provides a paging indication transmission method and an apparatus, to reduce a payload for a single transmission of a paging indication.

According to a first aspect, a paging indication transmission method is disclosed, including: sending, by a network device, a first paging indication to a terminal device; and sending, by the network device, a second paging indication to the terminal device, where the first paging indication and the second paging indication form a complete paging indication of the terminal device.

According to another aspect, a paging indication transmission method is disclosed, including: receiving, by a terminal device, a first paging indication sent by a network device; receiving, by the terminal device, a second paging indication sent by the network device; and obtaining, by the terminal device, a complete paging indication of the terminal device based on the first paging indication and the second paging indication.

The foregoing two aspects describe solutions of this application from perspectives of the terminal device and the network device, and apparatuses corresponding to the foregoing two methods are further disclosed in the following.

A network device includes a sending module, configured to send a first paging indication to a terminal device, where the sending module is further configured to send a second paging indication to the terminal device, and the first paging indication and the second paging indication form a complete paging indication of the terminal device.

With reference to the network device, the network device further includes a receiving module, configured to receive a response message sent by the terminal device, where the sending module is further configured to send a paging message to the terminal device.

A terminal device includes a receiving module, configured to receive a first paging indication sent by a network device, where the receiving module is further configured to receive a second paging indication sent by the network device; and a processing module, configured to obtain a complete paging indication of the terminal device based on the first paging indication and the second paging indication.

With reference to the terminal device, the terminal device further includes a sending module, configured to send a response message to the network device, where the receiving module is further configured to receive a paging message sent by the network device.

According to the foregoing paging indication transmission methods and apparatuses, the network device delivers the paging indication at two times, to reduce a payload for a single transmission of the paging indication.

With reference to the methods and the apparatuses according to all aspects, the first paging indication is transmitted by using a first PBCH resource block, and the second paging indication is transmitted by using a second PBCH resource block; the first paging indication is transmitted by using first remaining minimum system information (RMSI), and the second paging indication is transmitted by using second RMSI; the first paging indication is transmitted through a PBCH, and the second paging indication is transmitted by using RMSI or a PDCCH; the first paging indication is transmitted by using RMSI or a PDCCH, and the second paging indication is transmitted through a PBCH; the first paging indication is transmitted through a PDCCH, and the second paging indication is transmitted by using RMSI; or the first paging indication is transmitted by using RMSI, and the second paging indication is transmitted through a PDCCH. In conclusion, a transmission manner of the first paging indication and a transmission manner of the second paging indication may be selected from three manners: the PBCH, the RMSI or the PDCCH, or may use any combination of the three manners. In this manner, a payload for the PBCH, the RMSI, or the PDCCH is reduced during paging indication transmission.

With reference to the methods and the apparatuses in all the foregoing aspects, the first paging indication is used to indicate a part of group information of the terminal device, and the second paging indication is used to indicate a remaining part of the group information of the terminal device, and the part of the group information of the terminal device and the remaining part of the group information of the terminal device form complete group information of the terminal device. For example, the first paging indication is used to indicate a large-group identifier of the terminal device, and the second paging indication is used to indicate a small-group identifier of the terminal device. The terminal device may obtain the complete group information of the terminal device based on the first paging indication and the second paging indication.

With reference to the methods in all the foregoing aspects, the method further includes: receiving, by the network device, the response message sent by the terminal device, for example, beam information reported by the terminal device to the network device. Further, the network device may also send the paging message to the terminal device.

With reference to the methods in all the foregoing aspects, before the method, the method further includes: sending, by the network device, instruction information to the terminal device, where the instruction information is used to instruct the terminal device to use a paging indication-based paging mechanism or an LTE paging mechanism; and when the indication information is used to instruct the terminal device to use the paging indication-paging mechanism, the foregoing method is performed. In other words, before the method, the method further includes: sending, by the network device, the instruction information to the terminal device, where the instruction information is used to instruct the terminal device to use the paging indication-based paging mechanism.

With reference to the methods in all the foregoing aspects, the indication information is carried in the PBCH, the RMSI, a radio resource control (RRC) message, a media access control control element (MAC-CE), or downlink carrier information (DCI).

According to a second aspect, a paging mechanism indication method is disclosed, including: delivering, by a network device, indication information to a terminal device, where the indication information is used to notify the terminal device of a paging manner used by the network device, for example, indicating the terminal device that the network device uses an LTE paging mechanism or a paging indication-based paging mechanism.

According to another aspect, a paging mechanism indication method is disclosed, including: receiving, by a terminal device, indication information delivered by a network device, where the indication information is used to notify the terminal device of a paging manner used by the network device, for example, informing the terminal device that the network device uses an LTE paging mechanism or a paging indication-based paging mechanism.

The foregoing two aspects describe solutions of this application from perspectives of the terminal device and the network device, and apparatuses corresponding to the foregoing two methods are further disclosed in the following.

A network device is provided, including: a sending module, configured to deliver indication information to a terminal device, where the indication information is used to notify the terminal device of a paging manner used by the network device.

The network device may further include a receiving module, configured to receive a response message sent by the terminal device, where the sending module is further configured to send a paging message to the terminal device.

A terminal device is provided, including a receiving module, configured to receive indication information delivered by a network device, where the indication information is used to notify the terminal device of a paging manner used by the network device.

The terminal device may further include a sending module, configured to send a response message to the network device, where the receiving module is further configured to receive a paging message sent by the network device.

With reference to the methods and the devices in all the foregoing aspects, the indication information is a quantity of beams. When the quantity of beams is greater than a preset threshold, it indicates that the paging indication-based paging mechanism is used. When the quantity of beams is less than or equal to the preset threshold, it indicates that the LTE paging mechanism is used.

With reference to the methods and the devices according to the foregoing aspects, the indication information is carried in a PBCH, RMSI, an RRC message, a control channel that is used to schedule RMSI information, a CSI-RS), a MAC-CE, or DCI.

According to the foregoing methods and the devices, the terminal device may learn, based on the indication information of the network device, a corresponding paging manner of the network device. This facilitates reception of a paging of the network device.

According to a third aspect, a paging resource indication method is disclosed, including: delivering, by a network device, indication information to a terminal device, where the indication information is used to indicate a resource location of a control channel that is used to schedule a paging message, so that the terminal device searches the control channel that is used to schedule the paging message, based on the indication information in a corresponding resource location.

According to another aspect, a paging resource indication method is disclosed, including: receiving, by a terminal device, indication information delivered by a network device, where the indication information is used to indicate a resource location of a control channel that is used to schedule a paging message; and searching, by the terminal device, the control channel that is used to schedule the paging message, based on the indication information in a corresponding resource location.

The foregoing two aspects describe solutions of this application from perspectives of the terminal device and the network device, and apparatuses corresponding to the foregoing two methods are further disclosed in the following.

A network device is provided, including a sending module, configured to deliver indication information to a terminal device, where the indication information is used to indicate a resource location of a control channel that is used to schedule a paging message, so that the terminal device searches the control channel that is used to schedule the paging message, based on the indication information in a corresponding resource location.

A terminal device is provided, including: a receiving module, configured to receive indication information delivered by a network device, where the indication information is used to indicate a resource location of a control channel that is used to schedule a paging message; and a processing module, configured to search for the control channel that is used to schedule the paging message, based on the indication information in a corresponding resource location.

With reference to the methods and the devices in all the foregoing aspects, the indication information is carried in at least one of types of the following content: a PBCH, RMSI, a control channel that is used to schedule RMSI information, a CSI-RS, RRC, a MAC-CE, or DCI.

With reference to the methods and the devices in all the foregoing aspects, a resource of the control channel that is used to schedule the paging message is frequency-divided or time-divided with a resource of at least one of types of the following content: the PBCH, the RMSI, the control channel that is used to schedule the RMSI information, the CSI-RS, the RRC, the MAC-CE, or the DCI.

With reference to the methods and the devices in all the foregoing aspects, DCI of a plurality of paging occasions (PO) shares one resource of the control channel that is used to schedule the paging message. Further, the indication information is further used to indicate that the DCI of the plurality of POs shares one resource of the control channel that is used to schedule the paging message.

With reference to the methods and the devices in all the foregoing aspects, the control channel is a PDCCH.

With reference to the methods and the devices in all the foregoing aspects, a resource location of the PDCCH that is used to schedule the paging message is the same as or different from a location of the control channel that is used to schedule RMSI transmission. For example, locations on a time resource or a frequency resource are the same or different.

According to the foregoing methods and the devices, the network device delivers the indication information to the terminal device, so that the terminal device can reduce a quantity of blind detections on control channel information, thereby saving electricity of the terminal device.

An embodiment of this application further discloses a paging resource allocation method, including: allocating, by a network device to a terminal device, a resource of a control channel that is used to schedule a paging message, for example, a resource of a PDCCH that is used to schedule the paging message, where the resource of the PDCCH that is used to schedule the paging message includes DCI of a plurality of POs.

Correspondingly, the network device may include an allocation module, configured to perform the foregoing operation.

According to another aspect, a terminal device obtains a resource of a control channel that is used to schedule a paging message and that is allocated by a network device, and the terminal device obtains, based on a resource of a PDCCH that is used to schedule the paging message, DCI of a corresponding PO.

Correspondingly, the terminal device may include a receiving module and a processing module to respectively perform the foregoing operations.

With reference to the foregoing aspects, resources of PDCCHs of the plurality of POs may be multiplexed in time or frequency, and the resource of the PDCCH that is used to schedule the paging message may be multiplexed with a synchronization signal block (SS block).

According to the foregoing paging resource allocation method, DCI of different POs share the resource of the PDCCH. During resource allocation, overheads of beam scanning are reduced, and a resource allocation manner is more flexible.

The network device and the terminal device in the foregoing solutions have functions of implementing corresponding steps performed by the network device and the terminal device in the foregoing methods, and the functions may be implemented by hardware, or may be implemented by executing corresponding software by hardware. The hardware or the software includes one or more modules corresponding to the foregoing functions. For example, the sending module may be replaced by a transmitter, the receiving module may be replaced by a receiver, and another module such as the processing module may be replaced by a processor, to respectively perform the sending operation, the receiving operation, and the related processing operation in each method embodiment.

According to still another aspect of this application, a computer program product is provided, including an instruction. When the instruction is run on a computer, the computer is enabled to perform the methods according to the foregoing aspects.

According to still another aspect of this application, a communications chip is provided. The communications chip stores an instruction. When the instruction is run on a network device or a terminal device, a computer is enabled to perform the methods according to the foregoing aspects.

According to still another aspect of this application, a computer readable storage medium is provided. The computer readable storage medium stores an instruction. When the instruction is run on a computer, the computer is enabled to perform the methods according to the foregoing aspects.

BRIEF DESCRIPTION OF DRAWINGS

To describe technical solutions in embodiments of this application more clearly, the following briefly describes accompanying drawings used for describing the embodiments or the prior art.

DESCRIPTION OF EMBODIMENTS

A terminal device in the embodiments of this application may be an access terminal, a subscriber unit, a subscriber station, a mobile station, a mobile console, a remote station, a remote terminal, a mobile device, a user terminal, a terminal, a wireless communications device, a user agent, or a user apparatus. The access terminal may be a cellular phone, a cordless phone, a session initiation protocol (SIP) phone, a wireless local loop (WLL) station, a personal digital assistant (PDA), a handheld device or a computing device having a wireless communication function, another processing device connected to a wireless modem, a vehicle-mounted device, a wearable device, a terminal in a 5G network, or the like.

A network device in the embodiments of this application is a network side device that communicates with the terminal device in a wireless manner, for example, a wireless fidelity (Wi-Fi) access point, a base station of next generation communication such as a gNB, a small cell, or a micro cell in 5G, or a transmission reception point (TRP); or may be a relay station, an access point, a vehicle-mounted device, a wearable device, or the like.

A paging indication occupies many bits, and if a manner in which the paging indication is delivered at one time is used, a transmission payload is increased. Therefore, an embodiment of this application provides a method for transmitting a paging indication by a network device at two times. For example, the paging indication is separately transmitted at two times through a PBCH or a PDCCH. The method includes:

sending, by the network device by using a first PBCH resource block or first RMSI, a first paging indication to a terminal device; and sending, by the network device by using a second PBCH resource block or second RMSI, a second paging indication to the terminal device, where the first paging indication and the second paging indication form a complete paging indication of the terminal device.

Figure 1:
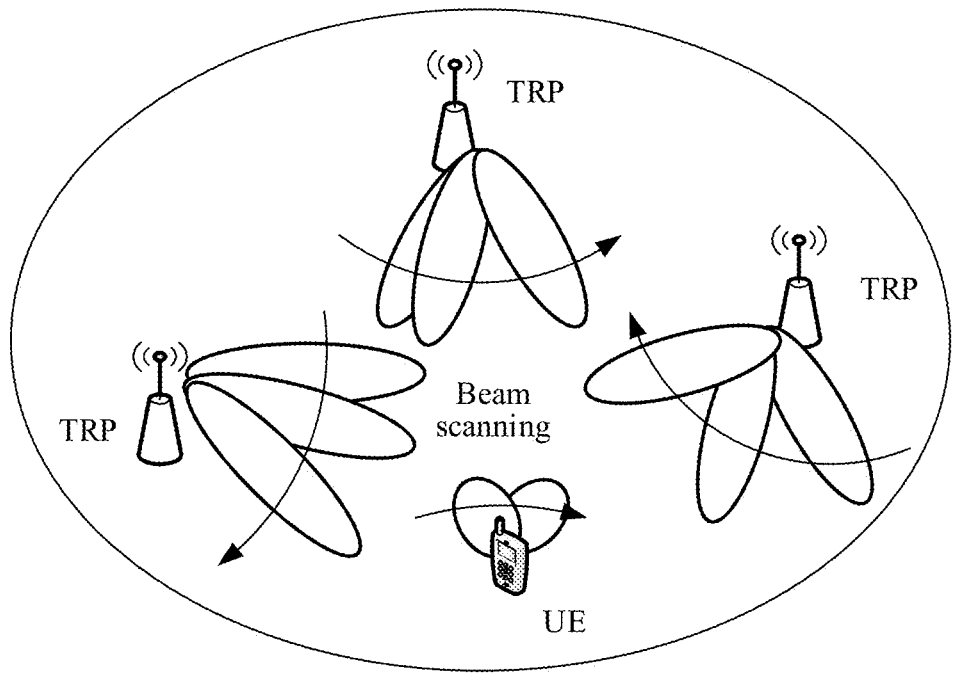
FIG. 1 is a schematic diagram of a network architecture in an application scenario according to an embodiment of this application.
Figure 2:
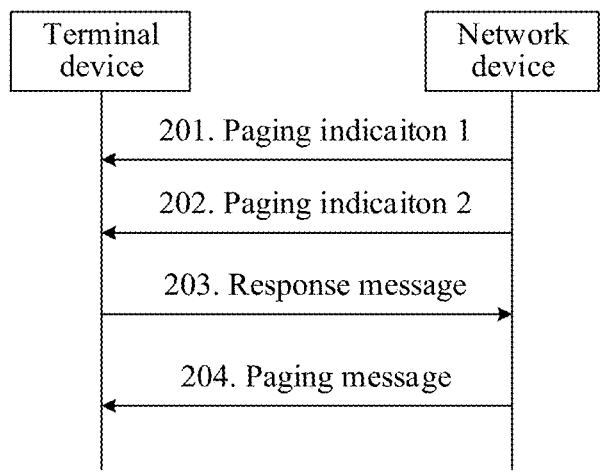
FIG. 2 is a flowchart of a paging indication transmission method according to an embodiment of this application.

With reference to the accompanying drawings, the following describes the foregoing paging indication transmission method. Reference is made to FIG. 2.

Operation 201. The network device sends a paging indication 1 to the terminal device.

The paging indication 1 may include M bits that are a part of bits in a complete paging indication, and is transmitted by using a PBCH 1 or RMSI 1. In other words, the paging indication 1 is carried in the PBCH 1 or the RMSI 1. For example, the M bits may represent a large group to which the terminal device belongs, for example, representing some bits in the group information of the terminal device.

Operation 202. The network device sends a paging indication 2 to the terminal device.

The paging indication 2 may include N bits that are a remaining part of the bits in the complete paging indication, and is transmitted by using a PBCH 2 or RMSI 2. In other words, the paging indication 2 is carried in the PBCH 2 or the RMSI 2. For example, the N bits may represent a small group to which the terminal device belongs, for example, representing remaining bits in the group information of the terminal device.

The paging indication 1 and the paging indication 2 form the complete paging indication of the terminal device.

Certainly, alternatively, the M bits may be used to represent a small group to which the terminal device belongs, and the N bits may represent a large group to which the terminal device belongs. The complete paging indication of the terminal device includes the paging indication 1 and the paging indication 2. In other words, there are M+N bits in the complete paging indication of the terminal device. The paging indication may alternatively be referred to as paging indication information or a paging indication message.

The PBCH 1 and the PBCH 2 represent two different PBCH resource blocks, for example, two resource blocks transmitted at different time points. The RMSI 1 and the RMSI 2 represent two different pieces of RMSI, for example, two pieces of RMSI transmitted at different time points.

According to a definition in 5G NR, system information blocks (SIB) are classified into two types: One is minimum system information (MSI); and the other is other system information (OSI). The MSI includes two types of information: One is information transmitted through a PBCH, such as a master information block (MIB); and remaining information is RMSI, and may be transmitted through a downlink shared channel (PDSCH). The RMSI 1 and the RMSI 2 may be different RMSI, for example, the RMSI transmitted at different time points, and the RMSI 1 and the RMSI 2 respectively carry the paging indication 1 and the paging indication 2.

The following provides description by using an example in which the paging indication is the group information of the terminal device. For example, the paging indication indicates the group information of the terminal device by using four bits whose values range from 0000 to 1111, and terminal device identifiers (ID) are classified into 16 groups, as shown in Table 1, and each group occupies four bits.

If the paging indication is delivered at two times, as shown in the following table, 16 terminal device identifiers are classified into four large-group identifiers (00, 01, 10, 11) and four small-group identifiers (00, 01, 10, 11), and each group identifier occupies two bits. First two bits represent a large-group identifier of the terminal device, and last two bits represent a small-group identifier of the terminal device. 0111 is used as an example. 01 represents a large group to which the terminal device belongs, and 11 represents a small group to which the terminal device belongs. The paging indication delivered by the network device at the first time represents the large-group identifier of the terminal device, namely, the first two bits, and is transmitted by using the PBCH 1/RMSI 1. The paging indication delivered at the second time represents the small-group identifier of the terminal device, namely, the last two bits, and is transmitted by using the PBCH 2/RMSI 2. After receiving the paging indication at two times, the terminal device learns of the complete paging indication of the terminal device, namely, the complete group identifier 0111 of the terminal device.

In this manner, only two bits rather than four bits need to be transmitted each time regarding the PBCH or the RMSI. This reduces a payload of the PBCH or the RMSI.

It should be noted that, the foregoing provides description by using an example in which a terminal device identifier occupies four bits, but the paging indication is not limited to four bits, and may include any quantity of bits.

TABLE 1

| Paging indication group | | | |
| --- | --- | --- | --- |
| 0000 | 0001 | 0010 | 0011 |
| 0100 | 0101 | 0110 | 0111 |
| 1000 | 1001 | 1010 | 1011 |
| 1100 | 1101 | 1110 | 1111 |

In the foregoing example, the paging indication delivered by the network device at the first time is the first two bits in the group information of the terminal device, and the paging indication delivered at the second time is the last two bits in the group information of the terminal device. Certainly, alternatively, the last two bits may be delivered at the first time, and the first two bits may be delivered at the second time. Alternatively, a bit is delivered at the first time, and remaining bits are delivered at the second time. For example, the first bit and the third bit are delivered at the first time, and the second bit and the fourth bit are delivered at the second time. Alternatively, the second bit is delivered at the first time, and the first bit, the third bit, and the fourth bit are delivered at the second time. After receiving the paging indication at two times, the terminal device may learn of the complete paging indication, namely, the complete group information of the terminal device.

Operation 203. After obtaining the complete paging indication based on the paging indication 1 and the paging indication 2, the terminal device sends a response message to the network device, for example, reporting beam information to the network device.

Operation 204. The network device delivers a paging message to the terminal device.

In another embodiment, a paging indication may also be transmitted at two times separately by using a PBCH, a PDCCH or RMSI. For example, the network device sends a first paging indication to the terminal device by using the RMSI or the PDCCH, and sends a second paging indication to the terminal device by using the PBCH, where the first paging indication and the second paging indication form a complete paging indication of the terminal device.

Alternatively, the network device sends a first paging indication to the terminal device through a PBCH, and sends a second paging indication to the terminal device by using RMSI or a PDCCH; the network device sends a first paging indication to the terminal device by using RMSI, and sends a second paging indication to the terminal device through a PDCCH; or the network device sends a second paging indication to the terminal device by using RMSI, and sends a first paging indication to the terminal device through a PDCCH.

Figure 3:
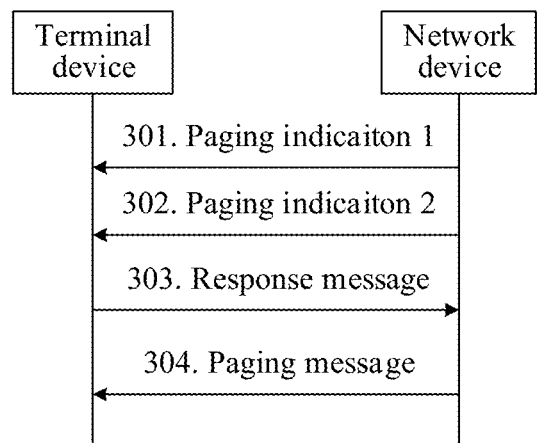
FIG. 3 is a flowchart of a paging indication transmission method according to another embodiment of this application.

The following provides description for the foregoing paging indication transmission method with reference to the accompanying drawings. Reference is made to FIG. 3.

Operation 301. A network device sends paging indication information 1 to a terminal device.

The paging indication 1 may include M bits that are a part of bits in a complete paging indication, and is transmitted by using RMSI or a PDCCH. In other words, the paging indication 1 is carried in the RMSI or the PDCCH. The M bits may represent a large group to which the terminal device belongs, for example, representing some bits in the group information of the terminal device.

Operation 302. The network device sends a paging indication 2 to the terminal device.

The paging indication 2 may include N bits that are a remaining part of the bits in the complete paging indication, and is transmitted through a PBCH. In other words, the paging indication 2 is carried in the PBCH. The N bits may represent a small group to which the terminal device belongs, for example, representing remaining bits in the group information of the terminal device.

The paging indication 1 and the paging indication 2 form the complete paging indication of the terminal device.

Certainly, alternatively, the M bits may be used to represent a small group to which the terminal device belongs, and the N bits may represent a large group to which the terminal device belongs. The complete paging indication of the terminal device includes the paging indication 1 and the paging indication 2. In other words, there are M+N bits in the complete paging indication of the terminal device. The paging indication may alternatively be referred to as paging indication information or a paging indication message.

Certainly, alternatively, the paging indication 1 may be transmitted through a PBCH, and the paging indication 2 may be transmitted by using RMSI or a PDCCH.

Alternatively, in another example, the paging indication 1 may be transmitted by using RMSI, and the paging indication 2 may be transmitted through a PDCCH; and vice versa.

A definition of the RMSI is similar to that in the foregoing embodiment, and details are not described again. The RMSI may be transmitted in a PDSCH.

If the paging indication is delivered at two times, as shown in the following table, 16 terminal device identifiers are classified into four large-group identifiers (00, 01, 10, 11) and four small-group identifiers (00, 01, 10, 11), and each group identifier occupies two bits. First two bits represent a large-group identifier of the terminal device, and last two bits represent a small-group identifier of the terminal device. 0111 is used as an example. 01 represents a large group to which the terminal device belongs, and 11 represents a small group to which the terminal device belongs. The paging indication delivered by the network device at the first time represents the large-group identifier of the terminal device, namely, the first two bits, and is transmitted by using the RMSI or the PDCCH. The paging indication delivered at the second time represents the small-group identifier of the terminal device, namely, the last two bits, and is transmitted through the PBCH. After receiving the paging indication at two times, the terminal device learns of the complete paging indication of the terminal device, namely, the complete group identifier 0111 of the terminal device.

In this manner, only two bits rather than four bits need to be transmitted each time regarding the PBCH, the PDCCH, or the RMSI. This reduces a payload of the PBCH, the PDCCH or the RMSI.

TABLE 1

| Paging indication group | | | |
|---|---|---|---|
| 0000 | 0001 | 0010 | 0011 |
| 0100 | 0101 | 0110 | 0111 |
| 1000 | 1001 | 1010 | 1011 |
| 1100 | 1101 | 1110 | 1111 |

In the foregoing example, the paging indication delivered by the network device at the first time is the first two bits in the group information of the terminal device, and the paging indication delivered at the second time is the last two bits in the group information of the terminal device. Certainly, alternatively, the last two bits may be delivered at the first time, and the last two bits may be delivered at the second time. Alternatively, a bit is delivered at the first time, and remaining bits are delivered at the second time. For example, the first bit and the third bit are delivered at the first time, and the second bit and the fourth bit are delivered at the second time. Alternatively, the second bit is delivered at the first time, and the first bit, the third bit, and the fourth bit are delivered at the second time. After receiving the paging indication at two times, the terminal device may learn of the complete paging indication, namely, the complete group information of the terminal device.

Operation 303. After obtaining the complete paging indication based on the paging indication 1 and the paging indication 2, the terminal device sends a response message to the network device, for example, reporting beam information to the network device.

Operation 304. The network device delivers a paging message to the terminal device.

In the foregoing two embodiments, the paging indication is delivered at two times, but not limited to two times, or may be delivered at three or more times.

In the foregoing embodiments, the paging indication is delivered at two or more times, and a part of the paging indication is delivered each time. Therefore, compared with a payload caused when the complete paging indication is delivered at one time, a payload caused during each delivery is reduced.

The embodiments of this application further disclose the network device and the terminal device in the foregoing two method embodiments.

Figure 4:
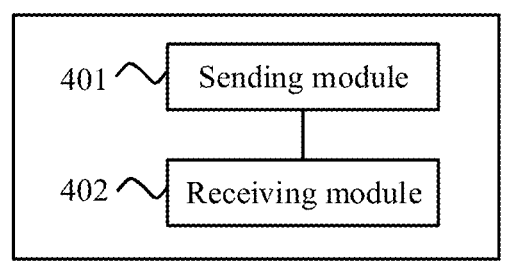
FIG. 4 is a schematic diagram of a terminal device according to an embodiment of this application.

Referring to FIG. 4, the network device includes:

a sending module 401, configured to send a first paging indication to a terminal device.

The sending module is further configured to send a second paging indication to the terminal device.

The first paging indication and the second paging indication form a complete paging indication of the terminal device. In other words, the complete paging indication of the terminal device includes the first paging indication and the second paging indication.

The network device further includes:

a receiving module 402, configured to receive a response message sent by the terminal device.

The sending module 401 is further configured to send a paging message to the terminal device.

Figure 5:
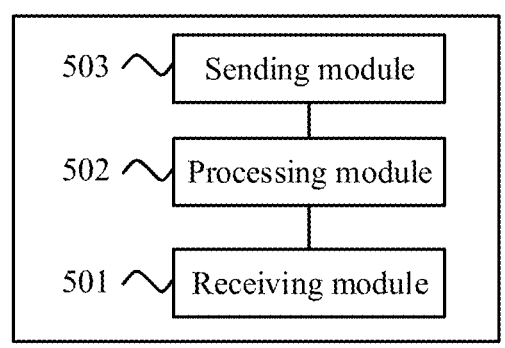
FIG. 5 is a schematic diagram of a network device according to an embodiment of this application.

Referring to FIG. 5, the terminal device includes:

a receiving module 501, configured to receive a first paging indication sent by a network device, where the receiving module 501 is further configured to receive a second paging indication sent by the network device; and a processing module 502, configured to obtain a complete paging indication of the terminal device based on the first paging indication and the second paging indication.

The terminal device further includes a sending module 503, configured to send a response message to the network device. The receiving module 501 is further configured to receive a paging message sent by the network device.

The foregoing network device and the foregoing terminal device are completely corresponding to the network device and the terminal device in the method embodiments, and a corresponding module performs a corresponding step. For example, the sending module performs a sending step in the method embodiments, the receiving module performs a receiving operation in the method embodiments, and other operations different from the sending operation and the receiving operation may be performed by the processing module. For a function of a specific module, refer to a corresponding method embodiment. Details are not described again.

Transmission with a single beam, a small quantity of beams, or a plurality of beams used may exist in a paging transmission mechanism in 5G NR. When there is a single beam or there are a small quantity of beams, a conventional LTE paging manner is used. However, when there are a plurality of beams, particularly in a high-frequency (above 6 GHz) scenario, a paging manner of the paging indication needs to be used. The paging manner of the paging indication is also referred to as a paging manner of beam scanning, and mainly includes: delivering, by a network device, a paging indication to a terminal device, feeding back, by the terminal device, a response message, for example, reporting beam information to the network device, and then sending, by the network device, a paging message to the terminal device. The paging indication may be delivered at one time, or may be delivered at two times as described in the foregoing method embodiments.

However, for a terminal device that just accesses the network device, which paging mechanism is used by the network device is unknown for the terminal device. An embodiment of this application further provides a paging mechanism indication method, including: delivering, by a network device, indication information to a terminal device, where the indication information is used to notify the terminal device of a paging manner used by the network device, to be specific, a paging manner used by the network device to page the terminal device. Further, the terminal device receives, based on the paging manner indicated by the network device, a paging message sent by the network device. For example, the indication information indicates the terminal device that the network device uses an LTE paging mechanism or a paging indication-based paging mechanism. A paging manner in which a paging indication is delivered at one time may be used in the paging indication-based paging mechanism, or a paging manner in which a paging indication may be delivered at two times in the foregoing method embodiments may be used.

The network device may notify the terminal device of a specific paging mechanism in any one of the following two manners.

Manner 1: An implicit notification manner: notifying, by the network device, the terminal device of a quantity of beams. When the quantity of beams is less than a preset threshold N, it indicates that the conventional LTE paging mechanism is used. When the quantity of beams is greater than the preset threshold N, it indicates that the paging manner of the paging indication is used.

Manner 2: An explicit notification manner: notifying, by the network device, the terminal device of a used paging manner. For example, the network device delivers an indication message to the terminal device, where the indication message is used to instruct the terminal device to use the LTE paging mechanism or the paging manner of the paging indication; and a PBCH, RMSI, RRC, a MAC-CE, or DCI may be used for indication. For example, one bit is used for indication. When a value of the bit is 0, it indicates that the conventional LTE paging mechanism is used; or when a value of the bit is 1, it indicates that the paging manner of the paging indication is used. If two bits or a plurality of bits are used, other values may also be used for indication.

The embodiments of this application further disclose the network device and the terminal device in the foregoing two method embodiments.

Similarly, reference may be made to FIG. 4. The network device includes a sending module 401, configured to deliver indication information to a terminal device. The indication information is used to notify the terminal device of a paging manner used by the network device.

The network device may further include a receiving module 402, configured to receive a response message sent by the terminal device. The sending module 401 is further configured to send a paging message to the terminal device.

Similarly, reference may be made to FIG. 4. The terminal device includes a receiving module 402, configured to receive indication information delivered by a network device. The indication information is used to notify the terminal device of a paging manner used by the network device.

The terminal device may further include a sending module 401, configured to send a response message to the network device. The receiving module 402 is further configured to receive a paging message sent by the network device.

With reference to the methods and the devices in all the foregoing aspects, the indication information is a quantity of beams. When the quantity of beams is greater than a preset threshold, it indicates that a paging indication-based paging mechanism is used. When the quantity of beams is less than or equal to the preset threshold, it indicates that the LTE paging mechanism is used.

In the methods and the devices in the foregoing aspects, the indication information is used to directly notify the terminal device that the paging manner used by the network device is the paging indication-based paging mechanism or the LTE paging mechanism.

In the methods and the devices in the foregoing aspects, the indication information may be carried in the PBCH, RMSI, control channel that is used to schedule RMSI information, CSI-RS, MAC-CE, or DCI.

The foregoing network device and the foregoing terminal device are completely corresponding to the network device and the terminal device in the method embodiments, and a corresponding module performs a corresponding step. For example, the sending module performs a sending step in the method embodiments, the receiving module performs a receiving step in the method embodiments, and other steps different from the sending step and the receiving step may be performed by the processing module. For a function of a specific module, refer to a corresponding method embodiment. Details are not described again.

An embodiment of this application further discloses a paging resource indication method, including: delivering, by a network device, indication information to a terminal device, where the indication information is used to indicate a resource location of a control channel that is used to schedule a paging message, so that the terminal device searches, based on the indication information, the control channel that is used to schedule the paging message in a corresponding resource location. Further, scheduling information of the paging message is obtained.

The scheduling information of the paging message is transmitted by the network device through a control channel, for example, a PDCCH. The terminal device searches the control channel for a time-frequency resource location of the paging message. Therefore, a time-frequency resource location of the control channel that is used to schedule the paging message needs to be notified by the network device to the terminal device. The network device may use a plurality of manners to indicate the time-frequency resource location of the control channel that is used to schedule the paging message. For example, a PBCH, RMSI, a control channel that is used to schedule RMSI information, a CSI-RS, RRC, a MAC-CE, or DCI may be used to notify the terminal device. The terminal device may be all terminal devices, a group of terminal devices, or a terminal device.

For example, the network device may use the PBCH to indicate a resource location of a control channel that is used to schedule a paging message, for example, a resource location of a PDCCH that is used to schedule the paging message. The terminal device (may be all or some of the terminal device) may search, based on the resource location of the PDCCH indicated by the PBCH, the PDCCH that is used to schedule the paging message, and the search manner may be blindly detecting a paging radio network temporary identifier (paging radio network temporary identifier, P-RNTI), or another manner. Certainly, the network device may use any one or more of the PBCH, the RMSI, the RRC, the control channel that is used to schedule the RMSI information, the CSI-RS, the MAC-CE, or the DCI to indicate the resource location of the PDCCH that is used to schedule the paging message, and the terminal device searches, in a corresponding resource location based on a corresponding indication, the PDCCH that is used to schedule the paging message.

In addition, a resource of the PDCCH that is used to schedule the paging message is frequency-divided or time-divided with at least one of types of the following content: the PBCH, the RMSI, the control channel that is used to schedule the RMSI information, the CSI-RS, the RRC, the MAC-CE, or the DCI.

Further, the resource of the PDCCH that is used to schedule the paging message may include DCI of a plurality of POs. In other words, the DCI of the plurality of POs may share the resource of the PDCCH that is used to schedule the paging message. In addition, the resource of the PDCCH that is used to schedule the paging message may be resources of PDCCHs of the plurality of POs, the resources of the PDCCHs of the plurality of POs may be multiplexed in time or frequency, and the network device may scan and send all the resources of the PDCCHs of the plurality of POs.

For example, for some terminal devices whose bandwidth exceeds synchronization signal bandwidth, resources of PDCCHs, used to schedule the paging message, of the some terminal devices may be frequency-divided or time-divided with a synchronization signal. In this case, when the synchronization signal is transmitted, the PDCCH that is used to schedule the paging message is transmitted together. Alternatively, the resources of PDCCHs that are used to schedule the paging message may be frequency-divided or time-divided with another signal, for example, the RMSI information, the control channel that is used to schedule the RMSI information, or a periodic CSI-RS. In addition, the resource location of the PDCCH that is used to schedule the paging message may be the same as a location of the control channel that is used to schedule RMSI transmission, or may be different from the location of the control channel that is used to schedule RMSI transmission.

In the foregoing embodiment, the network device delivers the indication information to the terminal device, so that the terminal device can reduce a quantity of blind detections on control channel information, thereby saving electricity of the terminal device.

The embodiments of this application further disclose the network device and the terminal device in the foregoing method embodiments.

The network device includes a sending module, configured to deliver indication information to a terminal device. The indication information is used to indicate a resource location of a control channel that is used to schedule a paging message, so that the terminal device searches the control channel that is used to schedule the paging message, based on the indication information in a corresponding resource location.

The terminal device includes a receiving module, configured to receive indication information delivered by a network device, where the indication information is used to indicate a resource location of a control channel that is used to schedule a paging message; and a processing module, configured for the terminal device to search the control channel that is used to schedule the paging message, based on the indication information in a corresponding resource location.

The foregoing network device and the foregoing terminal device are completely corresponding to the network device and the terminal device in the method embodiments, and a corresponding module performs a corresponding step. For example, the sending module performs a sending step in the method embodiments, the receiving module performs a receiving step in the method embodiments, and other steps different from the sending step and the receiving step may be performed by the processing module. For a function of a specific module, refer to a corresponding method embodiment. Details are not described again.

An embodiment of this application further discloses a paging resource allocation method, including: allocating, by a network device to a terminal device, a resource of a control channel that is used to schedule a paging message. For example, a resource of a PDCCH that is used to schedule the paging message, and the resource of the PDCCH that is used to schedule the paging message includes DCI of a plurality of POs. In other words, the DCI of the plurality of POs shares the resource of the PDCCH that is used to schedule the paging message. Alternatively, the resource of the PDCCH that is used to schedule the paging message may be resources of PDCCHs of the plurality of POs, the resources of the PDCCHs of the plurality of POs may be multiplexed in time or frequency, and the network device may scan and send all the resources of the PDCCHs of the plurality of POs. The terminal device obtains, based on the resource of the PDCCH that is used to schedule the paging message, DCI of a corresponding PO, and the DCI may be obtained in a blind detection manner or by performing searching based on the indication information delivered by the network device. DCI of different POs shares the resource of the PDCCH, so that when resource allocation is performed, overheads of beam scanning are reduced, and a resource allocation manner is more flexible. A PDSCH resource may be allocated as required, thereby reducing PDSCH overheads.

The paging resource allocation method may be used in a combination with the foregoing paging resource indication method.

In one embodiment, the DCI of the plurality of POs may share the resource of the PDCCH that is used to schedule the paging message, the network device may perform indication for all users, a group of users, or a specific terminal device, and notifies the terminal device of a resource location of a PDCCH that is used to schedule the paging message. The DCI of the plurality of POs may share one resource of the PDCCH that is used to schedule the paging message, for example, 2, 4, 8, 16, or 32 POs. Different POs may be indicated by using different P-RNTIs, or may be indicated by using specific PO numbers in the DCI. The DCI is used to indicate locations of paging resources of the plurality of POs, for example, a time-frequency resource location of the PDSCH. The paging resources of the plurality of POs may be consecutive, or may be inconsecutive. The terminal device may demodulate the paging information based on time-frequency resource locations of the paging indicated by the different POs in the PDCCH. The resource of the PDCCH that is used to schedule the paging message may further be the resources of the PDCCHs of the plurality of POs. The resources of the PDCCHs of the plurality of POs may be multiplexed in time or frequency, and the network device may scan and send all resources of the PDCCHs of the plurality of POs. The plurality of POs may be 2, 4 or 8 POs. Resources of PDCCHs of the different POs may be indicated by using different P-RNTIs, or may be indicated by using PO numbers in the DCI.

Figure 6:
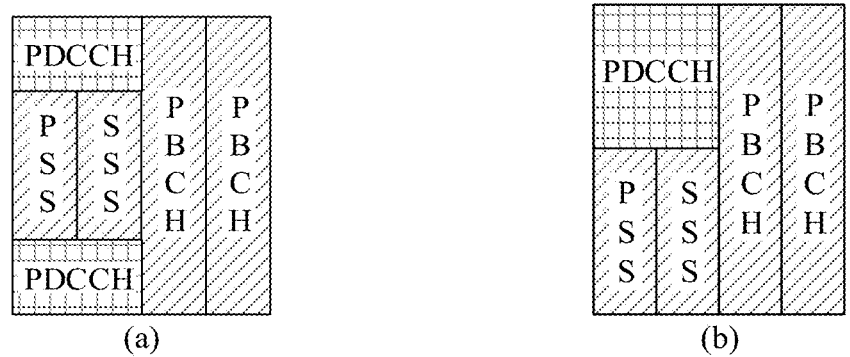
FIG. 6 is a schematic diagram of multiplexing of a control signal and a synchronization signal according to an embodiment of this application.

The resource location of the PDCCH may be multiplexed with a synchronization signal block (synchronization signal block, SS block). FIG. 6(a) and FIG. 6(b) show examples of the multiplexing method. The PDCCH multiplexed with the SS block may be a PDCCH that is used to schedule the paging message, a PDCCH for paging for short, and the SS block includes a primary synchronization signal (PSS) and/or a secondary synchronization signal (SSS); may be a PDCCH for RMSI transmission; or may be a PDCCH for both paging and RMSI. When the PDCCH and a PBCH are scanned together, a demodulation reference signal (DMRS) on the PBCH may be used as a DMRS on the PDCCH, to reduce resource overheads; a DMRS on the PDCCH is used as a DMRS on the PBCH, to reduce resource overheads; or the PDCCH and the PBCH share a DMRS, to reduce resource overheads and further enhance demodulation performance.

The embodiments of this application further disclose the network device and the terminal device in the foregoing method embodiments:

The network device includes an allocation module, configured to allocate, to the terminal device, a resource of a control channel that is used to schedule a paging message, for example, a resource of a PDCCH that is used to schedule the paging message, where the resource of the PDCCH that is used to schedule the paging message includes downlink control information (DCI) of a plurality of POs.

The terminal device includes: a receiving module, configured to obtain the resource, allocated by the network device, of a control channel that is used to schedule a paging message; and a processing module, configured to obtain DCI of a corresponding PO based on the resource of the control channel that is used to schedule the paging message.

The foregoing network device and the foregoing terminal device are completely corresponding to the network device and the terminal device in the method embodiments, and a corresponding module performs a corresponding step. For a function of a specific module, refer to a corresponding method embodiment. Details are not described again.

The network device and the terminal device in the foregoing apparatus embodiments corresponding to the methods have functions of implementing the steps performed by the network device and the terminal device in the foregoing method embodiments. The functions may be implemented by hardware, or may be implemented by executing corresponding software by hardware. The hardware or software includes one or more modules corresponding to the foregoing functions. In other words, corresponding function modules perform steps in the corresponding method embodiments respectively.

There may be another embodiment for the network device and the terminal device in all the apparatus embodiments corresponding to the methods. The sending module may be replaced by a transmitter, and the receiving module may be replaced by a receiver. Other modules, for example, the processing module may be replaced by a processor, separately perform a sending operation, a receiving operation, and a corresponding processing operation in all the method embodiments. The transmitter and the receiver may form a transceiver.

Figure 7:
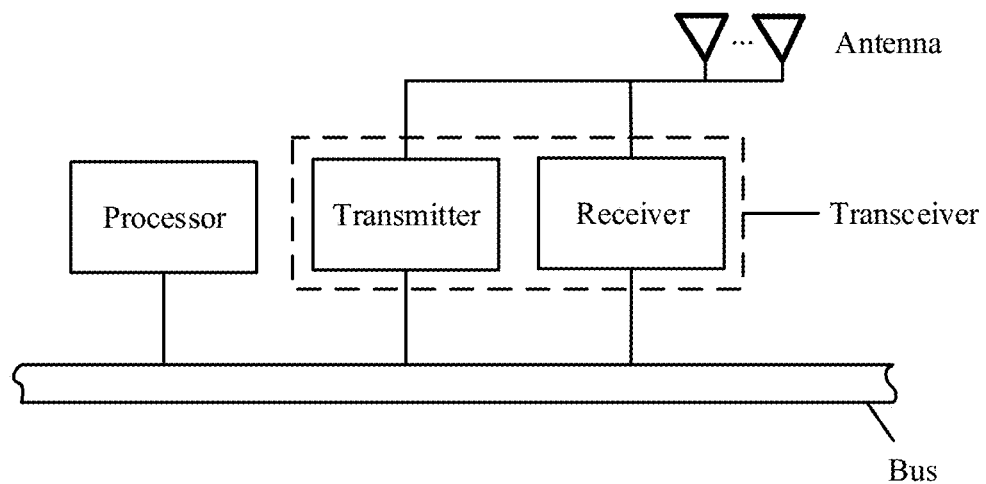
FIG. 7 is a schematic diagram of a network device/terminal device according to another embodiment of this application.

For a specific structure of the foregoing another apparatus embodiment, refer to FIG. 7. A processor may a general-purpose processor, a digital signal processor, an application-specific integrated circuit, a field programmable gate array, or another programmable logic device.

A transmitter and a receiver may form a transceiver. An antenna may further be included, and there may be one or more antennas.

In addition, a memory may further be included, and is configured to store related information such as a program or code. The memory may be an independent component, or may be integrated into the processor.

The foregoing components may be coupled together by using a bus. In addition to a data bus, the bus further includes a power bus, a control bus, and a status signal bus. However, for clear description, various types of buses in the figure are denoted as the bus.

FIG. 7 is merely a schematic diagram, and other components may be included or only a part of components may be included. For example, the transmitter and the receiver are included, or only the transmitter, the receiver and the processor are included.

The components or the part of the components in FIG. 7 may be integrated into a chip for implementation, for example, being integrated into a baseband chip.

Further, in a specific embodiment, a memory (not shown in the figure) may further be included, and is configured to store computer executable program code. The program code includes an instruction, and when the processor executes the instruction, the instruction enables the network device or terminal device to perform a corresponding step in the method embodiments.

All or some of the foregoing embodiments may be implemented by software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the procedures or functions are generated described in the embodiments of this application. The computer may be a general-purpose computer, a special-purpose computer, a computer network, or another programmable apparatus. The computer instructions may be stored in a computer readable storage medium, or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

What are disclosed above are merely embodiments of this application, and certainly are not intended to limit the protection scope of this application. Therefore, equivalent variations made in accordance with the claims of this application shall fall within the scope of this application.

What is claimed is:

1. A terminal device, comprising:
a receiving module configured to
receive a first paging indication at a first time in a first set of two bits of a 4-bit field and a second paging indication at a second time in a second set of two bits of the 4-bit field from a network device, wherein the first paging indication indicates a group identifier of the terminal device, and the second paging indication indicates a sub-group identifier of the terminal device, and
receive indication information delivered by a network device, wherein the indication information indicates a time-frequency resource location of a first control channel that schedules a paging message, wherein the indication information is delivered in one or more of the following manners: a physical broadcast channel (PBCH), remaining minimum system information (RMSI), a second control channel that schedules RMSI information, a channel state information reference signal (CSI-RS), a radio resource control (RRC) message, a media access control control element (MAC-CE), or downlink control information (DCI); and
a processing module configured to
obtain a complete paging indication of the terminal device based on the first paging indication and the second paging indication, and
search for the first control channel at the time-frequency resource location indicated by the indication information based on a paging radio network temporary identifier.

2. The terminal device according to claim 1, further comprising:
a sending module configured to send a response message to the network device, wherein
the receiving module is further configured to receive the paging message from the network device.

3. The terminal device according to claim 1, wherein the first paging indication indicates a group identifier, and the second paging indication indicates a sub-group identifier of the terminal device.

4. The terminal device according to claim 1, wherein the first paging indication is received by the terminal device using the RMSI or a physical downlink control channel (PDCCH), and the second paging indication is received by the terminal device using the PBCH.

5. The terminal device according to claim 1, wherein the first paging indication is represented by a first bit and a second bit of the 4-bit field, and the second paging indication is represented by a third bit and a fourth bit of the 4-bit field.

6. The terminal device according to claim 1, wherein the first paging indication is represented by a first bit and a third bit of the 4-bit field, and the second paging indication is represented by a second bit and a fourth bit of the 4-bit field.

7. The terminal device according to claim 1, wherein a resource of the first control channel that schedules the paging message is frequency-divided or time-divided with a resource of one or more of types of the following content: the PBCH, the RMSI, the second control channel that schedules the RMSI information, the CSI-RS, the RRC, the MAC-CE, or the DCI; or
the time-frequency resource location of the first control channel that schedules the paging message is the same as a location of the second control channel that schedules the RMSI information.

8. A paging resource indication method, comprising:
receiving, by a terminal device, indication information delivered by a network device, wherein the indication information indicates a time-frequency resource location of a first control channel that schedules a paging message, wherein the time-frequency resource location is multiplexed with a synchronization signal block, wherein the indication information is delivered in one or more of the following manners: a physical broadcast channel (PBCH), remaining minimum system information (RMSI), a second control channel that schedules RMSI information, a channel state information reference signal (CSI-RS), a radio resource control (RRC) message, a media access control element (MAC-CE), or downlink control information (DCI);
receiving, by the terminal device, a first paging indication at a first time in a first set of two bits of a 4-bit field and, a second paging indication at a second time in a second set of two bits of the 4-bit field, wherein the first paging indication indicates a group identifier of the terminal device, and the second paging indication indicates a sub-group identifier of the terminal device;

obtaining, by the terminal device, a complete paging indication of the terminal device based on the first paging indication and the second paging indication; and searching, by the terminal device, for the first control channel at the time-frequency resource location indicated by the indication information based on a paging radio network temporary identifier.

9. The method according to claim 8, wherein a resource of the first control channel that schedules the paging message is frequency-divided or time-divided with a resource of one or more of types of the following content: the PBCH, the RMSI, the second control channel that schedules the RMSI information, the CSI-RS, the RRC, the MAC-CE, or the DCI; or the time-frequency resource location of the first control channel that schedules the paging message is the same as a location of the second control channel that schedules the RMSI information.

10. The method according to claim 8, wherein the first paging indication is received by the terminal device using the RMSI or a physical downlink control channel (PDCCH), and the second paging indication is received by the terminal device using the PBCH.

11. The method according to claim 8, wherein the first paging indication is represented by a first bit and a second bit of the 4-bit field, and the second paging indication is represented by a third bit and a fourth bit of the 4-bit field.

12. The method according to claim 8, wherein the first paging indication is represented by a first bit and a third bit of the 4-bit field, and the second paging indication is represented by a second bit and a fourth bit of the 4-bit field.

13. The method according to claim 8, further comprising:
sending, by the terminal device, a response message to the network device, and receiving, by the terminal device, the paging message from the network device.

14. An apparatus, comprising:
a processor;
a memory coupled with the processor to program instructions, which, when executed, cause the processor to perform operations comprising:
receiving indication information delivered by a network device, wherein the indication information indicates a time-frequency resource location of a first control channel that schedules a paging message, wherein the time-frequency resource location is multiplexed with a synchronization signal block, wherein the indication information is delivered in one or more of the following manners: a physical broadcast channel (PBCH), remaining minimum system information (RMSI), a second control channel that is used to schedule RMSI information, a channel state information reference signal (CSI-RS), a radio resource control (RRC) message, a media access control control element (MAC-CE), or downlink control information (DCI);

receiving a first paging indication at a first time in a first set of two bits of a 4-bit field and, a second paging indication at a second time in a second set of two bits of the 4-bit field, wherein the first paging indication indicates a group identifier of a terminal device, and the second paging indication indicates a sub-group identifier of the terminal device;

obtaining a complete paging indication of the terminal device based on the first paging indication and the second paging indication; and searching for the first control channel at the time-frequency resource location indicated by the indication information based on a paging radio network temporary identifier.

15. The apparatus according to claim 14, wherein a resource of the first control channel that schedules the paging message is frequency-divided or time-divided with a resource of one or more of types of the following content: the PBCH, the RMSI, the second control channel that schedules the RMSI information, the CSI-RS, the RRC, the MAC-CE, or the DCI; or the time-frequency resource location of the first control channel that schedules the paging message is the same as a location of the second control channel that schedules the RMSI information.

16. The apparatus according to claim 14, wherein the first paging indication is received by the terminal device using the RMSI or a physical downlink control channel (PDCCH), and the second paging indication is received by the terminal device using the PBCH.

17. The apparatus according to claim 14, wherein the first paging indication is represented by a first bit and a second bit of the 4-bit field, and the second paging indication is represented by a third bit and a fourth bit of the 4-bit field.

18. The apparatus according to claim 14, wherein the first paging indication is represented by a first bit and a third bit of the 4-bit field, and the second paging indication is represented by a second bit and a fourth bit of the 4-bit field.

19. The apparatus according to claim 14, the operations further comprising:
sending, by the terminal device, a response message to the network device, and receiving, by the terminal device, the paging message from the network device.

* * * * *